United States Patent
Shimizu et al.

(10) Patent No.: US 7,796,159 B2
(45) Date of Patent: Sep. 14, 2010

(54) IMAGE CORRECTION DEVICE AND IMAGE CORRECTION METHOD

(75) Inventors: Toshiyuki Shimizu, Tokyo (JP); Yoshiki Ono, Tokyo (JP); Naoyuki Fujiyama, Tokyo (JP); Shuji Sotoda, Tokyo (JP); Yoshiko Hatano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 11/664,459

(22) PCT Filed: Apr. 6, 2006

(86) PCT No.: PCT/JP2006/307316

§ 371 (c)(1),
(2), (4) Date: Apr. 2, 2007

(87) PCT Pub. No.: WO2007/039947

PCT Pub. Date: Apr. 12, 2007

(65) Prior Publication Data

US 2007/0252899 A1    Nov. 1, 2007

(30) Foreign Application Priority Data

Oct. 4, 2005    (JP) ............................. 2005-290876

(51) Int. Cl.
*H04N 5/228* (2006.01)
*G06K 9/40* (2006.01)

(52) U.S. Cl. .................. 348/208.6; 348/208.4; 382/255

(58) Field of Classification Search ............ 348/208.99, 348/208.4, 208.6, 221.1; 382/255, 261
See application file for complete search history.

(56) References Cited

U.S. PATENT DOCUMENTS

| 5,844,627 A | * | 12/1998 | May et al. | 348/607 |
| 6,295,382 B1 | * | 9/2001 | Karanovic | 382/261 |
| 2003/0189655 A1 | * | 10/2003 | Lim et al. | 348/241 |

FOREIGN PATENT DOCUMENTS

| EP | 0 961 224 A1 | 12/1999 |
| EP | 1 289 309 A1 | 3/2003 |
| JP | 6-46321 A | 2/1994 |
| JP | 2000-224461 A | 8/2000 |
| JP | 2001-188272 A | 7/2001 |
| JP | 2004-32135 A | 1/2004 |
| JP | 2004-70421 A | 3/2004 |

* cited by examiner

*Primary Examiner*—Tuan Ho
(74) *Attorney, Agent, or Firm*—Birch, Stewart, Kolasch & Birch, LLP.

(57) ABSTRACT

An image correction method can perform adaptive correction processing to a taken image by a simple construction in a short time, and includes the steps of: computing window region local difference values for a plurality of neighboring pixels, each of the window region local difference values being a difference value between image data of a notice pixel (33a) in a difference value determination region (32) formed of a whole or a part of a screen area of an input image (31) and image data of a neighboring pixel in a window region (33) set around the notice pixel (33a), thereby determining a maximum local difference value which is a maximum value of the window region local difference values in each window region; determining a threshold value reflecting a characteristic of the input image on the basis of the maximum local difference value; producing adaptive filter coefficients for respective pixels of the input image by using the threshold value; and performing filter processing of the input image by using the adaptive filter coefficients.

14 Claims, 7 Drawing Sheets

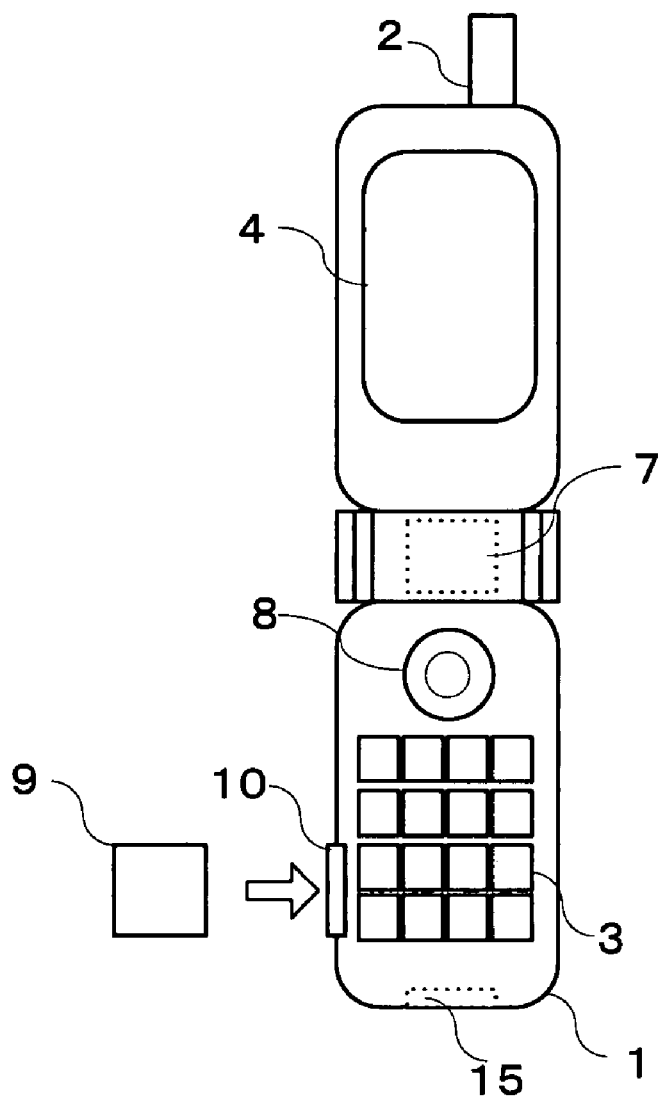
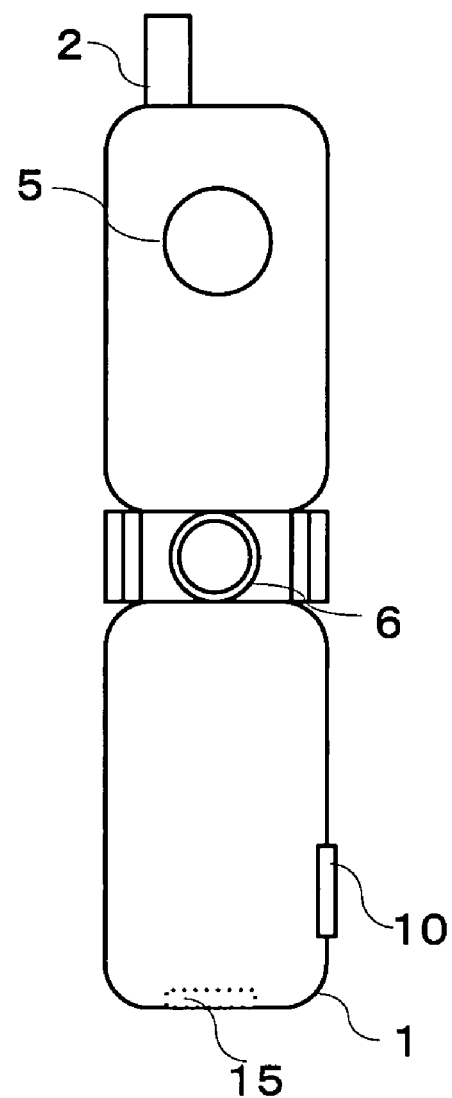

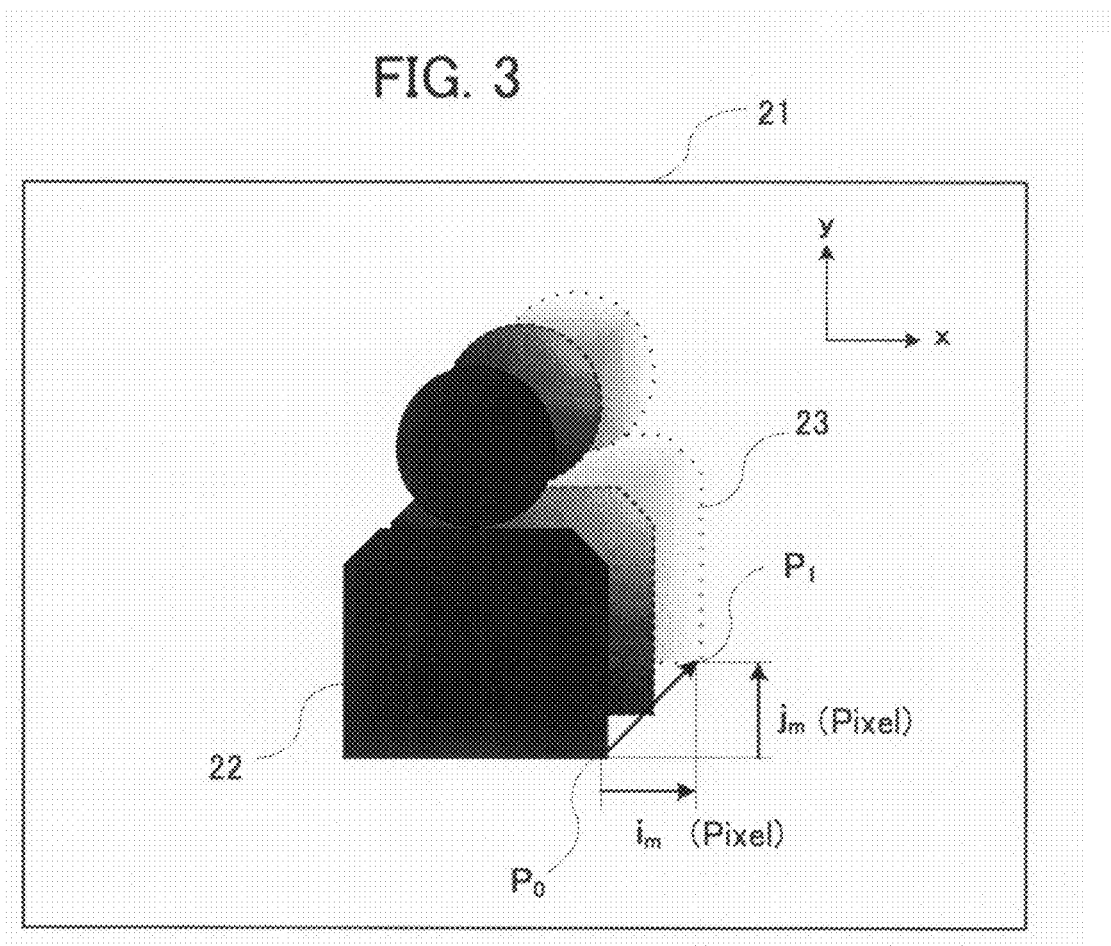

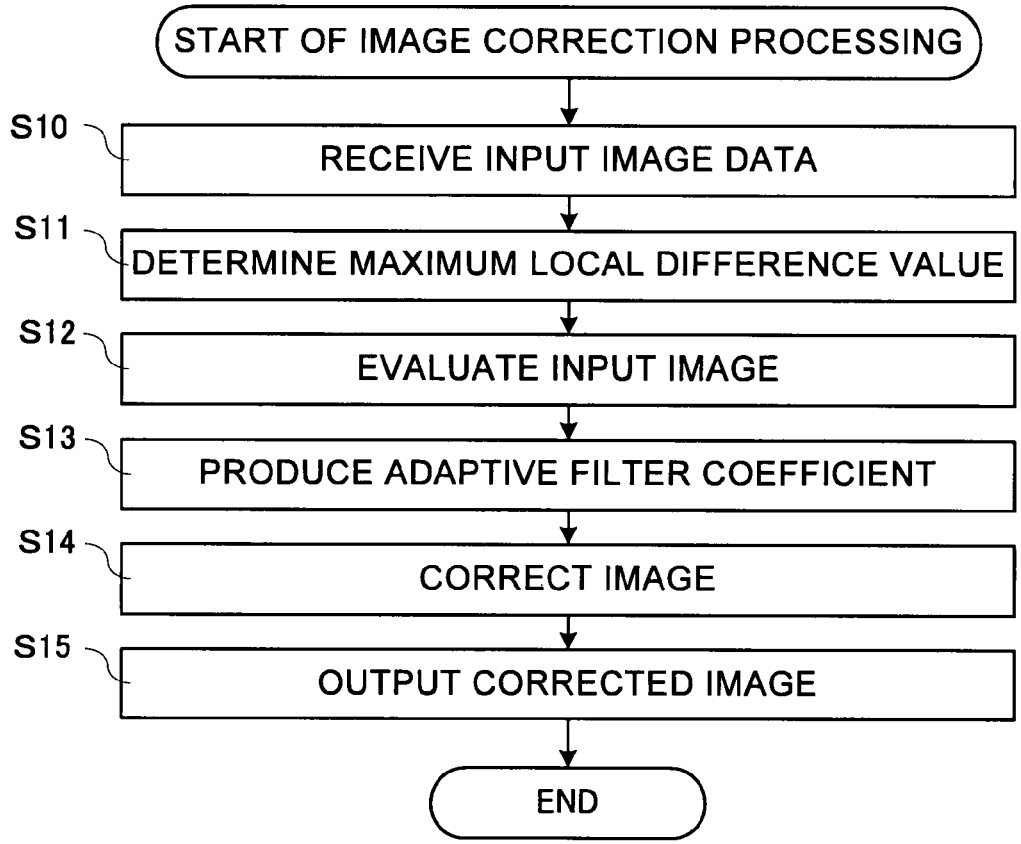
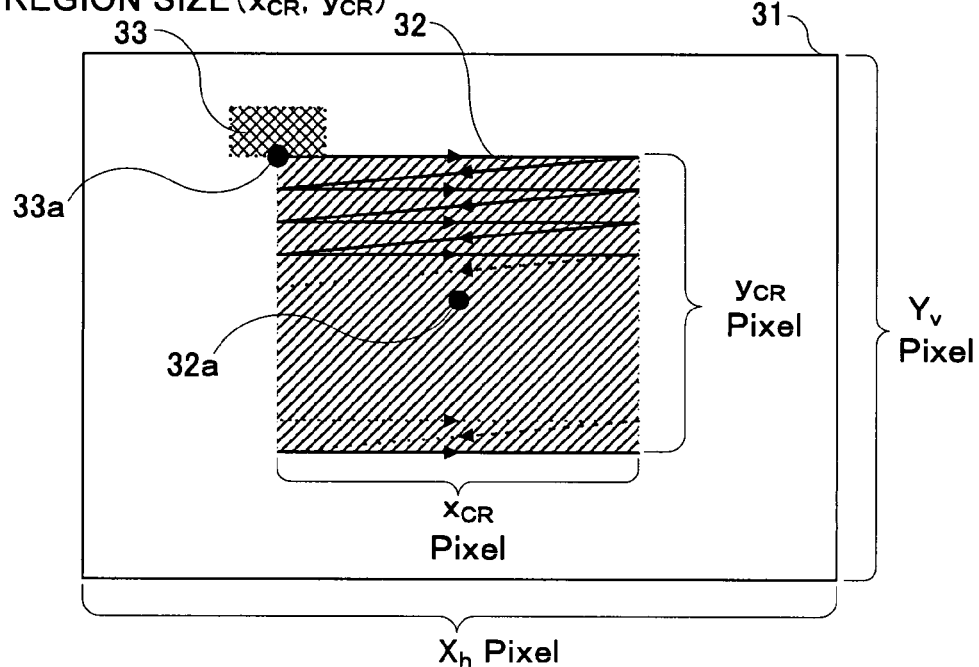

(WINDOW REGION WHEN −16≦i≦16 AND −16≦j≦16)

RELATIVE POSITION 'i' OR 'j' FROM NOTICE PIXEL (FILTER REGION WHEN $-3 \leq i \leq 3$ AND $0 \leq j \leq 3$)   $C(i, j)$ $C(i, j) = C(-i, -j)$

IMAGE CORRECTION DEVICE AND IMAGE CORRECTION METHOD

TECHNICAL FIELD

The present invention relates to an image correction device and an image correction method that are applied to a digital camera, a camera-equipped mobile terminal, a television (TV) system, a personal computer (PC) and so on; a program for causing a device to execute this method; and a recording medium for recording this program. The present invention particularly relates to an image correction device and an image correction method for correcting image degradation resulting from hand-held camera shake, i.e., hand movement or the like by data processing.

BACKGROUND ART

There are conventionally proposed various functions for correcting or recovering image degradation arising from aberration depending on an F number, a focal length, focus and so on, and image gradation resulting from hand-held camera shake, in a digital camera and a camera-equipped mobile terminal. For example, a recent digital camera including an optical system such as lens and an image pickup unit such as a CCD and a C-MOS sensor has a mechanical mechanism for reducing vibration of the optical system in order to suppress the effect of camera shake (for example, see Patent Document 1). Further, there is proposed a technology for correcting an acquired image data by using a computing circuit for converting pixel data taken by an image pickup unit (for example, see Patent Document 2).

In the above-mentioned conventional art, when a camera is vibrated by hand movement, the vibration is detected by a sensor and an amount of correction is computed in accordance with a detected signal, that is, the moving speed of the camera by hand movement. Then, an optical lens and/or an image pickup unit are/is moved in accordance with the computed amount of correction, or the values of the respective pixels of the image pickup unit are corrected by image processing computation, thereby correcting or preventing image degradation resulting from the hand-held camera shake. As a result, an image obtained by correcting the image degradation resulting from the hand-held camera shake or an image obtained by preventing the image degradation is recorded in a recording medium such as a flash memory.

Patent Document 1: Japanese Patent Application Kokai (Laid-Open) Publication No. 2001-188272 (page 13, FIG. 1)
Patent Document 2: Japanese Patent Application Kokai (Laid-Open) Publication No. 2000-224461 (page 16, FIG. 1)

DISCLOSURE OF THE INVENTION

Problems to be Solved by the Invention

However, in the above-mentioned conventional art, a camera shake sensor is required for detecting the moving speed of a camera at the time of taking an image. Therefore, there is a problem that the construction of a device becomes complicated.

Further, when the image gradation is corrected by image processing computation in accordance with the output of the camera shake sensor, time is used for image computation processing. Therefore, there is a problem that it takes time to record image data on a recording medium after an image is taken.

Therefore, the present invention has been made to solve the above-mentioned problems of the conventional art, and an object of the present invention is to provide an image correction device and an image correction method that can perform adaptive correction processing to a taken image by a simple construction in a short time.

Means for Solving the Problems

According to an aspect of the present invention, an image correction device includes: a difference value determination means which computes window region local difference values for a plurality of neighboring pixels, each of the window region local difference values being a difference value between image data of a notice pixel in a difference value determination region formed of a whole or a part of a screen area of an input image and image data of a neighboring pixel in a window region set around the notice pixel, and determines a maximum local difference value which is a maximum value of the window region local difference values in each window region; an input image evaluation means which determines a threshold value reflecting a characteristic of the input image in accordance with the maximum local difference value; a filter coefficient production means which produces adaptive filter coefficients for respective pixels of the input image by using the threshold value; and a filter processing means which performs filter processing of the input image by using the adaptive filter coefficients.

According to another aspect of the present invention, an image correction method includes the steps of: computing window region local difference values for a plurality of neighboring pixels, each of the window region local difference values being a difference value between image data of a notice pixel in a difference value determination region formed of a whole or a part of a screen area of an input image and image data of a neighboring pixel in a window region set around the notice pixel, thereby determining a maximum local difference value which is a maximum value of the window region local difference values in each window region; determining a threshold value reflecting a characteristic of the input image on the basis of the maximum local difference value; producing adaptive filter coefficients for respective pixels of the input image by using the threshold value; and performing filter processing of the input image by using the adaptive filter coefficients.

EFFECTS OF THE INVENTION

According to the present invention, there is an effect that the adaptive correction processing to a taken image can be performed by a simple construction in a short time.

BRIEF DESCRIPTION OF THE DRAWINGS

FIGS. 1A and 1B schematically show external views of a camera-equipped mobile terminal including an image correction device according to the first embodiment of the present invention (that is, a device for performing an image correction method according to the first embodiment), wherein FIG. 1A is a front view and FIG. 1B is a rear view;

FIG. 3 is a diagram showing one example of a blurred image taken by the mobile terminal according to the first embodiment.

FIG. 4 is a flow chart showing an image correction method according to the first embodiment;

FIG. 5 is a diagram showing a difference value determination region and a window region that are used in the image correction method according to the first embodiment;

Figure 2:
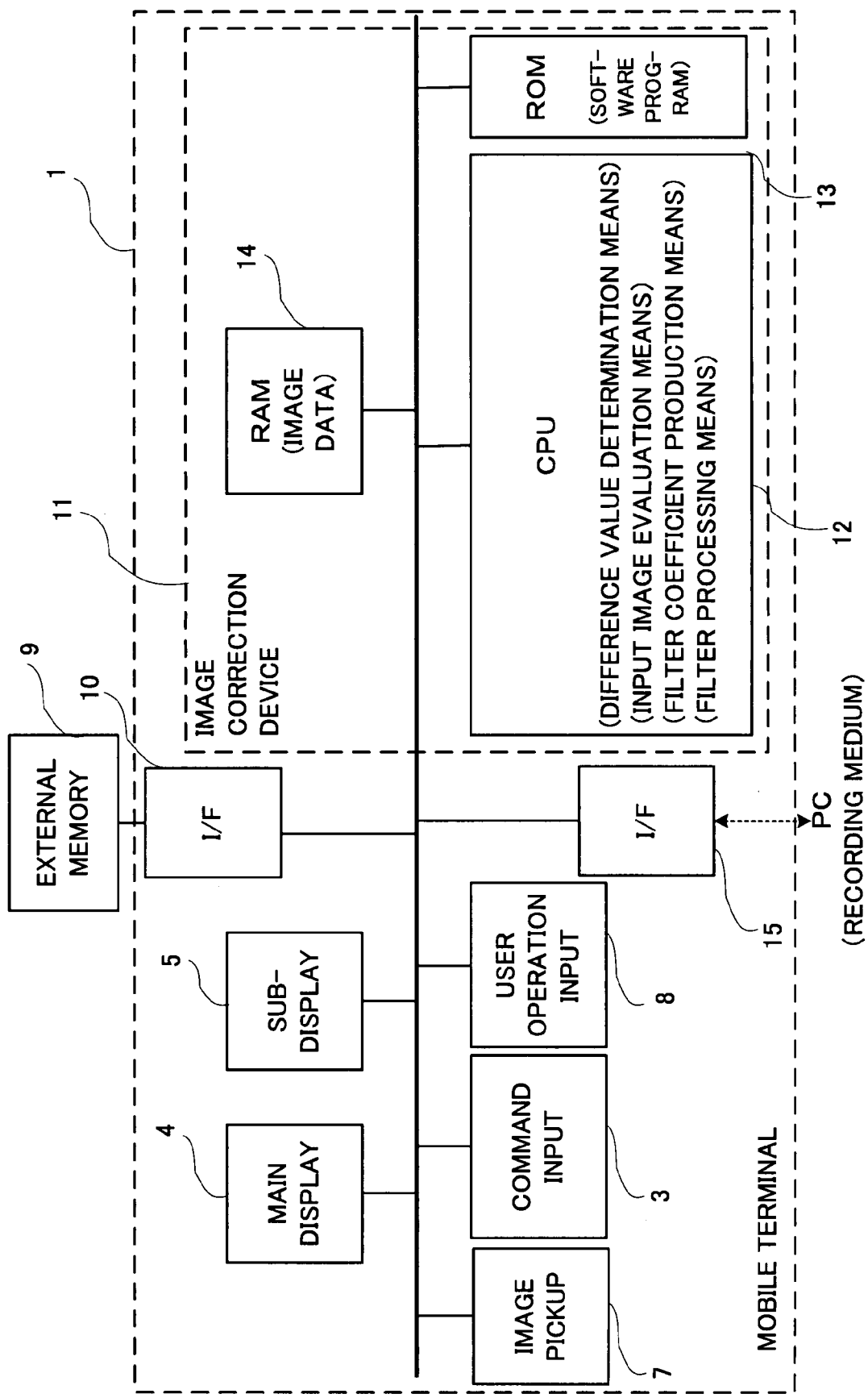
FIG. 2 is a block diagram showing the construction of the camera-equipped mobile terminal including an image correction device according to the first embodiment.

DESCRIPTION OF REFERENCE NUMERALS 1 mobile terminal; 2 antenna; 3 command input unit; 4 main display; 5 sub-display; 6 lens unit; 7 image pickup unit; 8 user operation input unit; 9 external memory; 10 external memory I/F; 11 image correction device; 12 CPU; 13 ROM; 14 RAM; 15 external device I/F; 21 taken image; 22 subject image; 23 blurred image; 31 input image; 32 difference value determination region; 32a reference point; 33 window region; 33a notice pixel; 34 whole window region; 35 effective filter region; A1-A9 focus determination region (difference value determination region).

BEST MODE FOR CARRYING OUT THE INVENTION

First Embodiment 1-1. Description of Mobile Terminal Including Image Correction Device FIGS. 1A and 1B schematically show external views of a camera-equipped mobile terminal 1 including an image correction device 11 according to the first embodiment of the present invention (that is, a device for performing an image correction method according to the first embodiment). FIG. 1A is a front view and FIG. 1B is a rear view. Further, FIG. 2 is a block diagram showing the construction of the mobile terminal 1.

As shown in FIGS. 1A and 1B or FIG. 2, the mobile terminal 1 includes: an antenna 2 which is used for communicating with the outside; a command input unit 3 which is used for inputting characters such as specific numbers, letters, and alphabets in order to communicate with the outside; a main display 4 which displays an outgoing (calling) number to the outside, an incoming (called) number from the outside, various kinds of character information that a user inputs by using the command input unit 3, and the information of an image taken by using a camera function; and a sub-display 5 which displays information of day and time, a remaining amount of a battery, presence of an incoming call and so on.

Further, the mobile terminal 1 includes: a lens unit 6 including a camera lens; an image pickup unit 7 such as a CCD and a C-MOS sensor, which receives the light of an optical image via the lens unit 6 and photoelectrically converts the received optical image; a user operation input unit 8 that can be used as buttons used for a user to operate or select GUI (Graphic User Interface) information displayed on the main display 4, a shutter button in a camera function, and other setting operation buttons in the camera functions; and an external memory interface (I/F) 10 that can be fitted with an external memory 9 such as a memory card for storing information such as image data acquired by using the camera function.

Furthermore, as shown in FIG. 2, the mobile terminal 1 includes: a CPU 12 which controls operation of the whole mobile terminal 1; a ROM 13 which stores software programs executed by the CPU 12; a RAM 14 which stores image data and the like; and an external device interface (I/F) 15 which is used for connecting with an external device such as a PC. The CPU 12 performs various operations such as difference value determination, input image evaluation, filter coefficient production, and filter processing, which will be described later, in accordance with the programs stored in the ROM 13. The programs to be stored in the ROM 13 are installed on the ROM 13 through an external device such as a PC that can read the information of an information recording medium such as a CD-ROM storing a program for installation and is connected to the external device I/F 15. Moreover, the programs can also be installed on the ROM 13 by an installation program downloaded through a communication line. The CPU 12, the ROM 13, and the RAM 14 operate as an image correction device 11 for performing the correction function of an image in the mobile terminal 1.

The constituents (not shown) of a lens, a lens driver, a diaphragm, a diaphragm driver, and an optical system such as an optical low-pass filter are arranged in the lens unit 6 shown in FIG. 1B. When an image is taken, the lens and the diaphragm are sequentially controlled in accordance with the output of a distance measuring sensor (not shown) and the brightness of a subject so that the image of the subject is formed on the image pickup unit 7 via the lens, the diaphragm, and the optical low-pass filter. When a user presses a button of the user operation input unit 8 that functions as a shutter button, the image pickup unit 7 outputs the image of the subject as an image signal to an A-D converter (not shown). The image signal is converted into a digital image signal (hereinafter referred to as "image data") by the A-D converter and then is recorded on the external memory 9.

1-2. Description of Blurred Image

FIG. 3 is a diagram showing an example of a blurred image taken by the mobile terminal 1. When both of the subject and the mobile terminal 1 held by the user stand still and the subject completely comes into focus, an image taken by the camera of the mobile terminal 1 becomes a still image free from the effect of camera shake. However, when the subject stands still but an image is taken while the mobile terminal 1 is being moved, a taken image 21 becomes an image subjected to the effect of camera shake in a certain direction (hereinafter also referred to as a "blurred image"). When a direction in which the camera is moved by hand-held camera shake is a direction on a two-dimensional plane, the taken image 21 becomes a blurred image shown, for example, in FIG. 3. Here, $i_m$ and $j_m$ denote a component in the x direction (unit: Pixel or picture element) and a component in the y direction (unit: Pixel or picture element) of a vector showing the hand-held camera shake (shown by an arrow $P_0P_1$ in FIG.

3) respectively. Further, $i_m$ and $j_m$ are also referred to as the amount of hand movement in the x direction and the amount of hand movement in the y direction respectively. In FIG. 3, a blurred image 23 is acquired between a subject image 22 and a position shifted by $i_m$ Pixels in the x direction and by $j_m$ Pixels in the y direction from the subject image 22.

As shown in FIG. 3, the amounts of hand movement ($i_m$ Pixels in the x direction and $j_m$ Pixels in the y direction) are varied by the moving velocity of the mobile terminal 1 at the time of taking the subject (a direction and a speed of hand movement and hereinafter also referred to as a "hand movement velocity") and a shutter speed. When a shutter speed is fast, even if the hand movement velocity is high, the values of $i_m$ and $j_m$ become small, whereas when the shutter speed is slow, even if the hand movement velocity is low, the values of $i_m$ and $j_m$ become large. Since the shutter speed can be made faster as the brightness of the subject is higher, when a bright subject is taken, the effect of hand-held camera shake is hard to appear in a taken image. However, when a subject is taken in a dark environment or when a subject is taken in a room at night, it is inevitable that the shutter speed tends to become slow, so that the effect of hand-held camera shake is easy to appear in a taken image easily. As described above, when a subject is taken by the camera of the mobile terminal 1, there are cases where the effect of hand-held camera shake appears in a taken image, depending on image taking conditions and the like. Therefore, in the present invention, acquired image data is subjected to image processing in accordance with a certain algorithm, thereby being subjected to correction processing. With this, the effect of hand-held camera shake can be reduced.

1-3. Outline of Image Correction Method

FIG. 4 is a flow chart showing an image correction method according to the first embodiment. Processes shown in FIG. 4 are processes in which a CPU 12 performs in accordance with a program in the ROM 13 for the image data acquired using a camera by a user.

In the image correction method according to the first embodiment, first, input image data is inputted to the image correction device 11 by taking an image or from an external memory 9 or from an external device via the external device I/F 15 (step S10).

Next, the CPU 12 operates as a difference value determination means (step S11). In step S11, the CPU 12 computes a window region local difference value $D_w$, which is a difference value between the image data of a notice pixel (shown by a reference character 33a in FIG. 5 which will be described later) in a difference value determination region (shown by a reference character 32 in FIG. 5 which will be described later) formed of a whole or a part of the screen area of an input image and the image data of a neighboring pixel in a window region (shown by a reference character 33 in FIG. 5 and FIG. 6 which will be described later) set around the notice pixel, for a plurality of neighboring pixels, and determines the maximum local difference value $D_{max}$ which is a maximum window region local difference value $D_w$ in each window region. In this regard, not the difference between pixel data between pixels but other index (degree of difference) varying in accordance with the difference between pixel data between pixels can also be used as the difference value between pixel data between pixels.

Next, the CPU 12 operates as an input image evaluation means (step S12). In step S12, the CPU 12 evaluates the contents of the taken image in accordance with the maximum local difference value $D_{max}$ and determines a threshold value $D_t$ reflecting the characteristic of the input image.

Next, the CPU 12 operates as a filter coefficient production means (step S13). In step S13, the CPU 12 produces an adaptive filter coefficient for each pixel of the input image by using the threshold value $D_t$. When the coordinates of each pixel of the input image are denoted by (i, j), it is assumed that an adaptive filter coefficient is denoted by C(i, j).

Next, the CPU 12 operates as a filter processing means (step S14). In step S14, the CPU 12 performs filter processing of the input image by using the produced adaptive filter coefficient C(i, j) for each pixel, thereby correcting image data (step S14), and outputs corrected image data to the external memory 9 (step S15).

Further, image correction processing shown in FIG. 4 is started, for example, by the first to third procedures to be described below. In the first procedure, taken image data is temporarily stored in the RAM 14 and the stored image data is automatically subjected to image correction processing shown in FIG. 4. In this case, all of the taken image data is subjected to the image correction processing irrespective of the presence or absence of hand-held camera shake. Furthermore, the first procedure includes also a case where a device automatically determines the presence or absence of hand-held camera shake of the taken image data in accordance with a certain algorithm and determines in accordance with a result of the determination result whether or not the taken image data is corrected. In the second procedure, the taken image data is temporarily stored in the RAM 14 and an image based on the image data are displayed on the main display 4 and the correction processing of the taken image data is started at a time of a user operation by the user that visually recognizes a display image. In this case, the taken image data comes to be subjected to the correction processing in accordance with the determination of the user. In the third procedure, the taken image data is written in the external memory 9 and at a later date the image data is displayed on the main display 4 and the image correction processing shown in FIG. 4 is started at a time of a user operation by the user that visually recognizes a display image. Also in this case, the taken image data comes to be subjected to the correction processing in accordance with the determination of the user.

1-4. Description of Maximum Local Difference Value Determination Step

Figure 6:
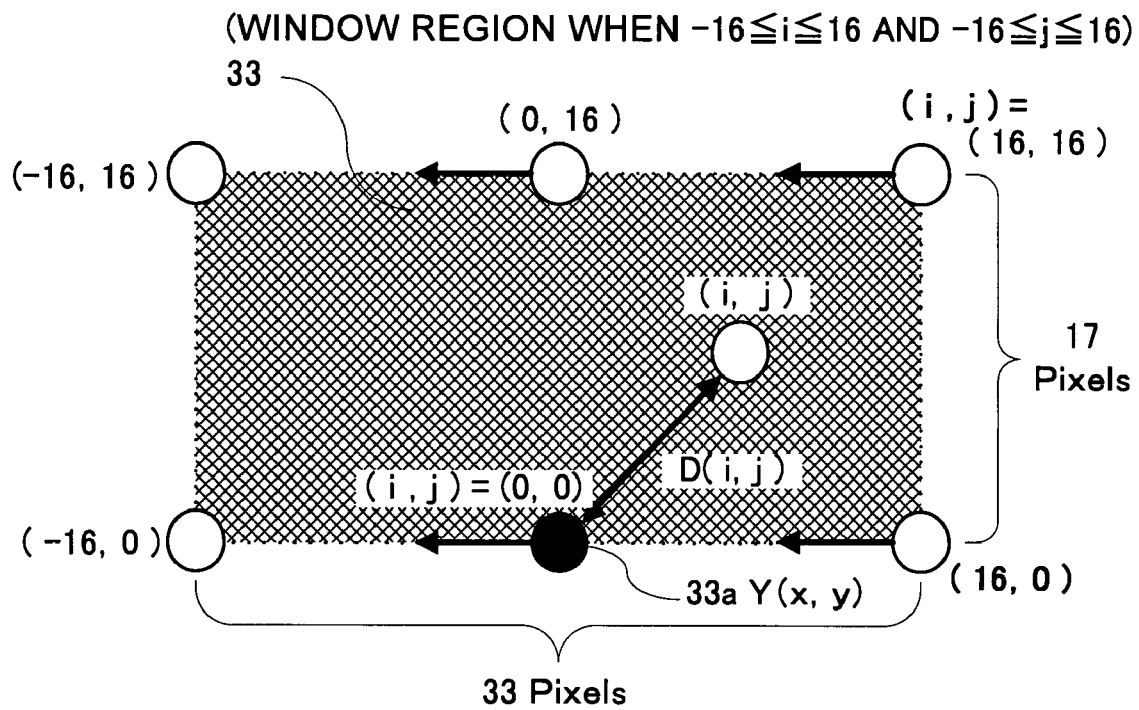
FIG. 6 is a diagram for explaining a window region local difference value found in the image correction method according to the first embodiment.

Next, the contents of the image correction processing will be described in detail. FIG. 5 is a diagram showing a difference value determination region 32 and a window region 33 used in the image correction method according to the first embodiment. Further, FIG. 6 is a diagram for explaining the window region local difference value $D_w$ found by the image correction method according to the first embodiment.

Image data when the user holds the mobile terminal 1 in hand and takes the image of a subject is constructed of data of eight bits (0 to 255) for respective R, G, and B colors. RGB digital image data acquired by taking the image is inputted from, for example, the RAM 14 or the external memory 9, and is matrix-converted into digital image data composed of eight bits (0 to 255) for respective Y, Cb, and Cr in order to obtain Y data.

The CPU 12 performs processing of the maximum local difference value determination (step S11), which will be described later, with regard to the Y data having the luminance information of the respective data of Y, Cb, and Cr outputted after performing the matrix conversion processing, to find a correlation value specific to each characteristic of the taken image (in this embodiment, a difference value is found as an index corresponding to a correlation value). Here, as shown in FIG. 5, when the data size of the taken image is $X_h$ Pixels in a lateral direction and $Y_v$ Pixels in a longitudinal direction, the inputted Y data also becomes image data having the data size of $X_h$ Pixels (eight bits) in the lateral direction and $Y_v$ Pixels (eight bits) in the longitudinal direction. Hereinafter, the Y data of a pixel at coordinates (x, y) is denoted by Y(x, y).

When the maximum local difference value $D_{max}$ is determined (step S11 in FIG. 4), the sizes $x_{CR}$ and $y_{CR}$ of the difference value determination region 32 with a reference point 32a set at the center of an image region are defined first for the input image data. The sizes $x_{CR}$ and $y_{CR}$ of the difference value determination region 32 are as follows.

$x_{CR} \leq X_h$ $y_{CR} \leq Y_v$

For example, the sizes $x_{CR}$ and $y_{CR}$ are defined as follows.

$(1/4)X_h \leq x_{CR} \leq (3/4)X_h$ $(1/4)Y_v \leq y_{CR} \leq (3/4)Y_v$

Here, while the difference value determination region 32 is set as a partial area in the center of a screen in FIG. 5, the whole region of the input image data may be set as the difference value determination region 32. Further, the size of the difference value determination region 32 may be changed arbitrarily.

Next, a local difference value D(i, j) between the image data Y(x, y) of each pixel in the difference value determination region 32 determined by the above-mentioned method and the image data of each pixel in the window region 33 is computed. The window region 33 is, for example, a region shown in FIG. 5 and its detail is shown in FIG. 6. In FIG. 6, a pixel 33a shown by a black circle is a notice pixel in the difference value determination region 32. The window region 33 is a rectangular region (a cross-hatched region in FIG. 5 and FIG. 6) extending in the horizontal directions and in the upward vertical direction with respect to the notice pixel 33a. In FIG. 6, a region of thirty-three pixels in the horizontal direction and seventeen pixels in the vertical direction is shown by way of example, but the window region 33 of the other size may be defined if the number of pixels in the horizontal direction is an odd number. The reason why the window region 33 is defined as a region extending in the upper vertical direction of the notice pixel 33a is to reduce a computation processing time required to perform the following processing. Therefore, when the computation processing time does not need to be reduced, the window region can also be defined as a region extending both in the upper vertical direction and in the lower vertical direction of the notice pixel. Further, the window region 33 can also be defined as a region extending in the lower vertical direction, in the right horizontal direction, or in the left horizontal direction of the notice pixel 33a.

In FIG. 6, when it is assumed that the coordinates of the window region 33 with respect to the notice pixel 33a is set with a reference point at the position of the notice pixel 33a and that the coordinates of the notice pixel 33a are (0, 0), the coordinates of a pixel at a right above corner of the window region 33 become (16, 16), and the image data of the notice pixel 33a and the image data of the pixel at a right above corner with respect to the notice pixel 33a can be denoted by Y(x, y) and Y(x+16, y+16) respectively. The local difference value D(i, j) between the image data Y(x, y) of the notice pixel 33a existing in the difference value determination region 32 shown in FIG. 5 and the image data of a certain pixel having coordinates (i, j) in the window region 33 shown in FIG. 6 is defined as the following equation.

$$D(i,j) = |Y(x,y) - Y(x+i, y+j)| \quad (1)$$

where i and j are integers within the following ranges.

$-16 \leq i \leq 16$ $0 \leq j \leq 16$

Figure 7:
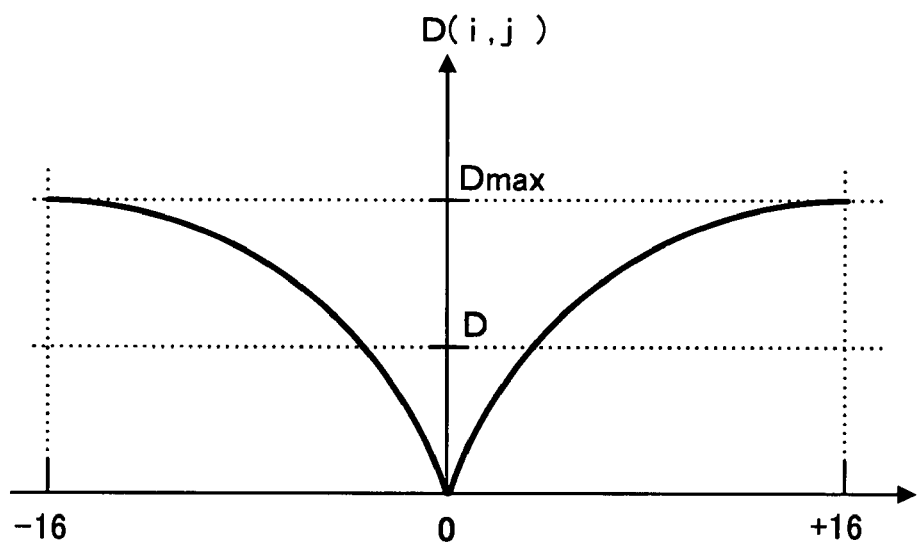
FIG. 7 is a diagram showing an example of a local difference value with respect to a relative position from a notice pixel in the image correction method according to the first embodiment.

FIG. 7 is a diagram showing an example of a local difference value D(i, j) of a relative position from the notice pixel 33a in the image correction method according to the first embodiment. FIG. 7 shows typical values, which are taken by the local difference value D(i, j) shown by the equation (1), in a one-dimensional direction (in an i direction or in a j direction). The local difference value D(i, j) of the notice pixel 33a is zero. The local difference value D(i, j) on a pixel located at a position far away from the notice pixel 33a, as shown in FIG. 7, tends to become larger as the pixel is farther away from the notice pixel 33a. Further, in the image data taken without hand-held camera shake when focus and F number are suitably set, the correlation between the pixels tends to be low, whereas in the image data taken with hand-held camera shake, the correlation between the pixels tends to be high. Therefore, when the image data taken with hand-held camera shake is compared with the image data taken without hand-held camera shake, the image data taken with hand-held camera shake tends to be higher in the correlation between adjacent pixels and tends to be smaller in the local difference value. As described above, the local difference values D(i, j) found for the notice pixel in the difference value determination region 32 can be used as a parameter showing a frequency at which the hand-held camera shake occurs for each acquired taken image data.

The local difference values D(i, j) in the window region 33 are found for all pixels in the previously determined difference value determination region 32 by using the above-mentioned method. At this time, for example, a scanning method shown by an arrow in FIG. 5 can be adopted. Here, as to the local difference values D(i, j) corresponding to a pixel existing at coordinates (i, j) in the window region 33 that are found for all notice pixels 33a in the difference value determination region 32, a local difference value having the largest value among the scanned local difference values D(i, j) is defined as a window region local difference value of its taken image and is denoted by $D_w(i, j)$.

Figure 8:
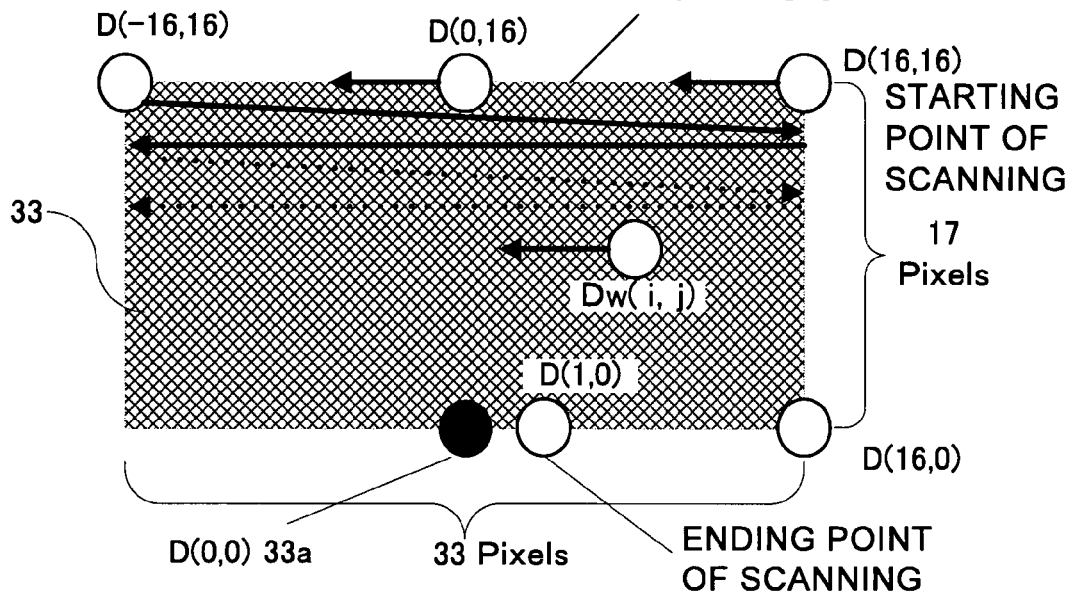
FIG. 8 is a diagram for explaining operation for finding a window region local difference value in the image correction method according to the first embodiment.

FIG. 8 is a diagram showing the operation of finding a window region local difference value $D_w(i, j)$ in the image correction method according to the first embodiment. In FIG. 8, when the coordinates of the notice pixel 33a is assumed to be (0, 0), as to a local difference value D(i, j) found for a pixel existing at coordinates (i, j) in the window region 33, a maximum local difference value corresponding to each pixel existing at coordinates (i, j) of all local difference values computed by scanning all pixels in the difference value determination region 32 is shown as a window region local difference value $D_w(i, j)$. When the above-mentioned operation is expressed by an equation, the following equation (2) is obtained. Here, $MAX_{(x,y)}\{f(x, y)\}$ means a maximum value of a function f(x, y) of a pixel existing at coordinates (x, y) in the difference value determination region 32.

$$D_w(i,j) = MAX_{(x,y)} |Y(x,y) - Y(x+i, y+j)| \quad (2)$$

where i and j are integers within the following ranges.

$-16 \leq i \leq 16$ $0 \leq j \leq 16$

The window region local difference value $D_w(i, j)$ in the equation (2) is determined for the image characteristics in the difference value determination region 32 of the image data and expresses the property (difference value) of an acquired image taken with hand-held camera shake. Further, the ranges of i and j in this case correspond to those of FIG. 8 and may take other values in accordance with the size of the window region 33 to be actually used.

Next, the maximum local difference value $D_{max}$ of the window region local difference values $D_w(i, j)$ found by scanning the inside of the difference value determination region 32 is found in accordance with the window region local difference values $D_w(i, j)$. As a method for finding the maximum local difference value $D_{max}$, a method for finding the maximum local difference value $D_{max}$ from among all of the window region local difference values $D_w(i, j)$ in FIG. 8 may be adopted or, in order to shorten a computation time, for example, a method for extracting only window region local difference values $D_w(16, 16)$, $D_w(0, 16)$, $D_w(-16, 16)$, and $D_w(16, 0)$ of four specific points in FIG. 8 and then selecting the maximum local difference value $D_{max}$ from among them may be adopted. When the above-mentioned operation is expressed by an equation, the following equation (3) is obtained.

$$D_{max} = \text{MAX}_{(i,j)}\{D_w(i,j)\} \quad (3)$$

where i and j are integers within the following ranges.
 $-16 \leq i \leq 16$
 $0 \leq j \leq 16$ The determination processing of the maximum local difference value $D_{max}$ is then finished.

1-5. Description of Input Image Evaluation Step

Next, the CPU 12 performs an input image evaluation (step S12 in FIG. 4). In the input image evaluation, a characteristic value (evaluation value) specific to each taken image data is determined by performing the following operation. The maximum local difference value $D_{max}$ in equation (3) is one constant value determined for an image characteristic in the difference value determination region 32 for each taken image data and expresses the property (maximum difference value) of the acquired image taken with hand-held camera shake. Moreover, the ranges of i and j correspond to FIG. 8 and may take other values in accordance with the size of the window region 33 to be actually used. A threshold value $D_t$ shown below is determined by using the maximum local difference value $D_{max}$ corresponding to a certain acquired image data computed by the above-mentioned method.

$$D_t = k \cdot D_{max} \quad (4)$$

A character k in equation (4) is a constant value determined within a range of from 0 to 1 and the value of k is determined previously for each acquired image data. Usually, k is a constant value of ½. Further, k may be also a variable value that increases or decreases from ½ in accordance with the acquired image data. For example, it can be thought to adopt a method for determining the characteristic of an acquired image and reflecting the characteristic to the value of k. By performing the above-mentioned operation, the threshold value $D_t$ of a result obtained by evaluating the image characteristic for each acquired image data is determined and the operation of input image evaluation (step S12 in FIG. 4) is finished.

1-5. Description of Filter Coefficient Production Step

Next, the CPU 12 performs adaptive filter coefficient production (step S13 in FIG. 4). In step S13 of producing an adaptive filter coefficient, an adaptive filter coefficient $C(i, j)$, by which the taken image data is multiplied, is determined by equations (5) and (6) or equations (7) to (9) in accordance with the threshold value $D_t$ determined by performing the operation of input image evaluation. Fundamentally, a filter coefficient region found here has a size (region) twice the window region 33 (expandable also to a lower half region).

The following equation (5) holds:

$$C(i,j) = \alpha\{D_w(i,j) - D_t\}/D_t \quad (5)$$

where i and j are integers satisfying the following conditions.
 $(i, j) \neq (0, 0)$ Further, the following equation (6) holds:

$$C(i,j) = C(-i,-j) \quad (6)$$

where i and j are integers within the following ranges.
 $0 \leq i \leq 16$
 $0 \leq j \leq 16$ A method for determining an adaptive filter coefficient defined in equation (5) by using the window region local difference value $D_w(i, j)$, which is determined by equation (2) and is a maximum local difference value corresponding to each pixel at coordinates (i, j) of the window region 33, normalizes the difference value $\{D_w(i, j) - D_t\}$ between the window region local difference value $D_w(i, j)$ and the threshold value $D_t$ by the threshold value $D_t$, thereby determining an adaptive filter coefficient $C(i, j)$ corresponding to each pixel at the coordinates (i, j) of the window region 33.

Equation (5) defines all adaptive filter coefficients within the ranges of i and j determined by the size of the window region 33 except for an adaptive filter coefficient $C(0, 0)$ at the center.

Figure 9:
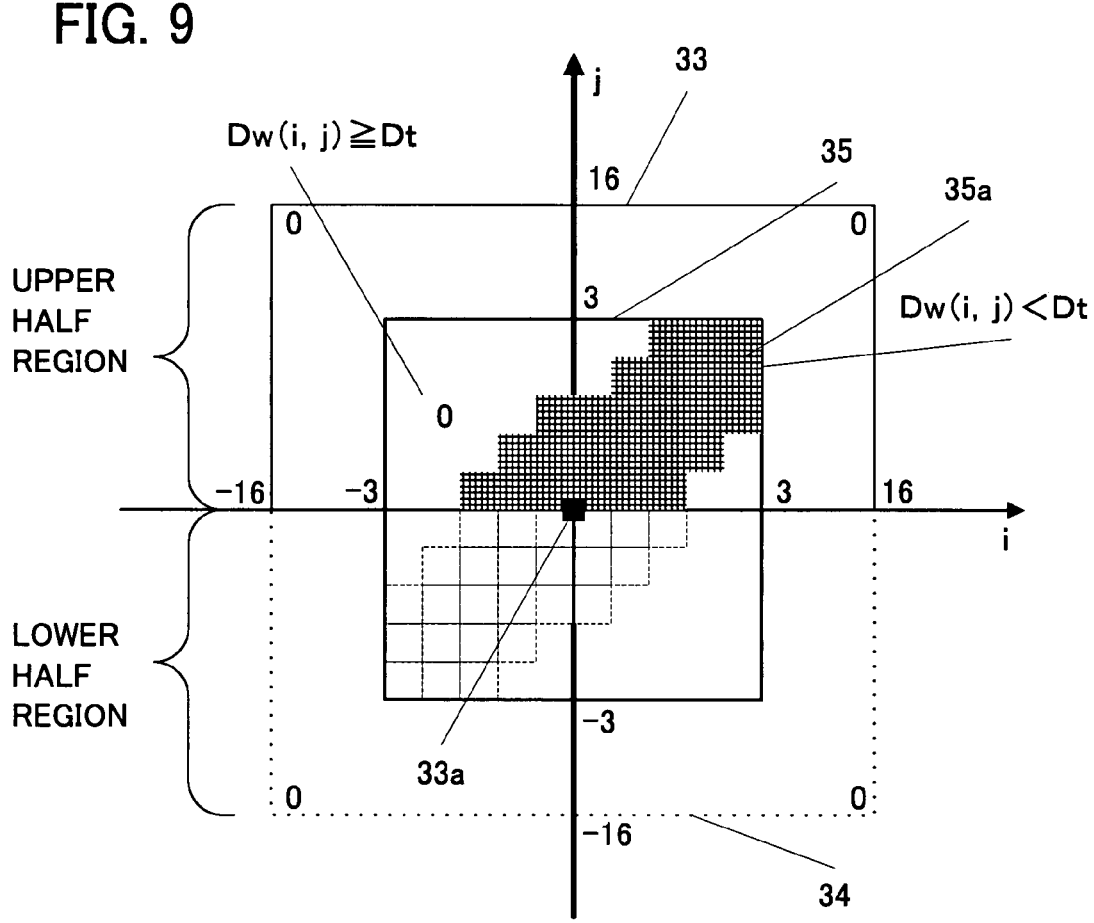
FIG. 9 is a diagram for explaining a method for determining an effective filter region from a window region in the image correction method according to the first embodiment.

The following equation (7) holds:

$$C(i,j) = \alpha\{D_w(i,j) - D_t\}/D_t \quad (7)$$

where i and j are integers satisfying the following conditions.
 $D_w(i, j) < D_t$
 $(i, j) \neq (0, 0)$ Further, the following equation (8) holds:

$$C(i,j) = 0 \quad (8)$$

where i and j are integers satisfying the following conditions.
 $D_w(i, j) \geq D_t$
 $(i, j) \neq (0, 0)$ Further, the following equation (9) holds:

$$C(i,j) = C(-i,-j) \quad (9)$$

where i and j are integers within the following ranges.
 $0 \leq i \leq 16$
 $0 \leq j \leq 16$ FIG. 9 is a diagram for explaining a method for determining an effective filter region 35 from the window region 33 in the image correction method according to the first embodiment. A method for determining an adaptive filter coefficient defined in equation (5) by using the window region local difference value $D_w(i, j)$, which is the maximum local difference value determined by equation (5) and corresponding to the respective coordinates (i, j) of the window region 33 is a method that normalizes using the threshold value $D_t$, the difference value $\{D_w(i,j)-D_t\}$ between the window region local difference value $D_w(i, j)$ and the threshold value $D_t$, thereby determining an adaptive filter coefficient C(i, j) corresponding to the respective coordinates (i, j) of the window region 33.

Further, a method for determining an adaptive filter coefficient defined by equations (7) to (9) corresponds to a method including processing for determining an adaptive filter coefficient defined by equations (5) and (6) and the following processing. In the method for determining an adaptive filter coefficient defined by equations (7) to (9), when the window region local difference value $D_w(i, j)$ is compared with the threshold value $D_t$ and the window region local difference value $D_w(i, j)$ has a larger value than the threshold value $D_t$, the filter coefficient of coordinates $(i_{max}, j_{max})$ is fixed to zero.

The coefficient α in equations (6) and (7) is a variable capable of varying the effect of the filter processing and a value of 1 (fixed value) is usually used as α, but a variable value may be used as α in such a way that the value of α is varied for each acquired image.

The adaptive filter coefficient C(i, j) corresponding to the coordinates (i, j) in each window region 33 is determined using the above-mentioned method. The window region local difference value $D_w(i, j)$ determined by the window region 33 defined only in the upper half region of the notice pixel 33a corresponds to the upper half region, as shown in FIG. 8, so that the filter coefficient to be determined corresponds also only to the upper half region (window region 33) in FIG. 9. Therefore, by defining the filter coefficient of the lower half region below the notice pixel as being symmetric with respect to the point of the notice pixel 33a, that is, C(i,j)=C(-i,-j), the filter coefficients in the whole region shown as the whole window region 34 (including the window region 33) in FIG. 9 are determined.

Further, when the above-mentioned method for determining a filter coefficient is used, the determined filtering region has the size of the whole window region 34 shown in FIG. 9. However, in the filtering region determined by the method shown by equations (7) to (9), there are many coordinates where the filter coefficient is made zero by the value of threshold value $D_t$ depending on the kind of a taken image, so that a useless computation processing time becomes elongated when a computation time is taken into account. Therefore, when the method shown by equations (7) to (9) is used, it is also possible to use a method that once determines the adaptive filter coefficient C(i, j) determined by the above-mentioned method by the CPU 12 to find a maximum coordinate range where filter coefficients not being zero exist for the respective coordinate axes of i and j and uses a smaller filtering region obtained from the found coordinates as a new effective filter region 35.

The above-mentioned operation method will be described using a specific operation example. For example, if an effective filter coefficient region which is determined by the method of equation (7) in certain acquired image data and where filter coefficients not being zero exist is a region 35a shown in FIG. 9 and hatched by grid, when an effective maximum region is determined for each i and j, the filtering region becomes −3≦i≦3 and 0≦j≦3.

Therefore, the effective filter region 35 determined in this case and shown in FIG. 9 is determined as a smaller region than the whole window region 34. Therefore, as shown in FIG. 10, the CPU 12 arrays filter coefficients, which are obtained by scanning filter coefficients from a starting point of C(3, 3) to a point of C(1, 0) along a broken line in FIG. 10, at the coordinates of positions symmetric with respect to a point of C(0, 0), thereby determining the effective filter region 35 and their filter coefficients.

Figure 10:
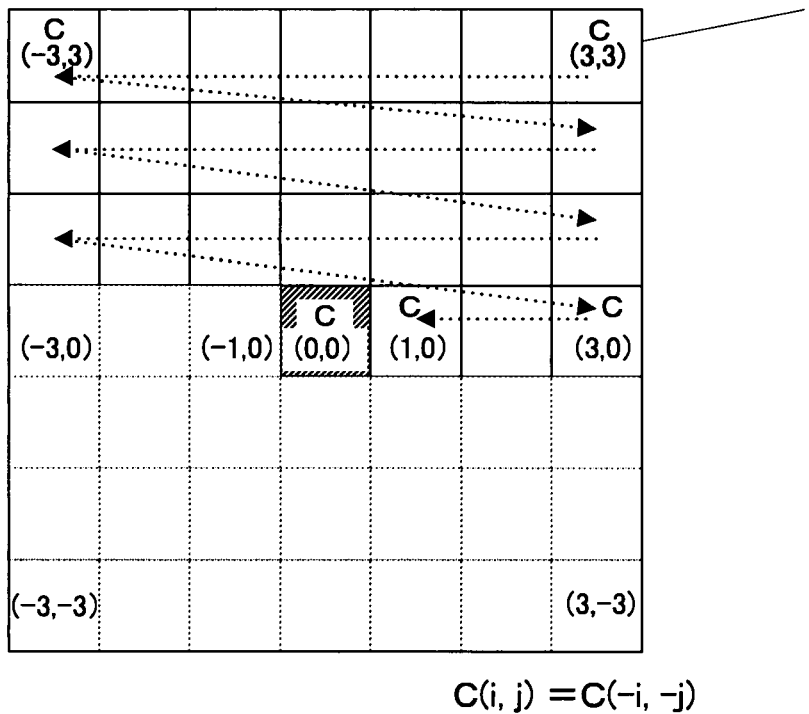
FIG. 10 is a diagram showing the filter coefficient of each pixel in an effective filter region in the image correction method according to the first embodiment.

FIG. 10 is a diagram showing the adaptive filter coefficients of the respective pixels in the effective filter region 35 in the image correction method according to the first embodiment. The filter coefficients except for a central position can be determined by the above-mentioned method. Therefore, an adaptive filter coefficient C(0, 0) at the central position is determined by the following equation (10) when the filtering region and the filter coefficients determined by the above-mentioned method are, for example, within the ranges (−3≦i≦3 and −3≦j≦3) shown in FIG. 10.

$$C(0, 0) = 1 - \sum_{i=-3}^{3}\sum_{j=-3}^{-1} C(i, j) - \sum_{i=-3}^{3}\sum_{j=1}^{3} C(i, j) - \sum_{i=-3}^{-1} C(i, 0) - \sum_{i=1}^{3} C(i, 0) \quad (10)$$

When the filter coefficient for the central position is found by the method of equation (10), all of the filter coefficients can be determined. The filter coefficients determined by a combination of equations (5), (6) and equation (10) have the filtering size of the whole window region. Therefore, when the acquired blurred image is subjected to filter processing using the found adaptive filter coefficient, as a result, the acquired blurred image is provided with the edge enhancement effect of high-pass filtering. In this manner, when the image taken with hand-held camera shake is provided with the edge enhancement effect, a user that visually recognizes the corrected image is hard to recognize the blurred image resulting from hand-held camera shake according to human visual characteristics.

Further, as compared with a case where the adaptive filter coefficients determined by a combination of equations (5), (6) and equation (10) are used, when the adaptive filter coefficients determined by a combination of equations (7) to (9) and equation (10) are used, the following control is possible. That is, by using a method for enabling only filter coefficients of only a region where the window region local difference value $D_w(i, j)$ is smaller than the threshold value $D_t$, it is possible to control not so as to perform processing of an image as much as possible, in which the blurred image resulting from hand-held camera shake is less apt to be visually recognized, because its edge is inherently conspicuous.

Furthermore, when the adaptive filter coefficients determined by a combination of equations (7) to (9) and equation (10) are used, by removing the filtering region, in which the values of the filter coefficients become zero, as much as possible and by determining a filtering region including only effective filter coefficients not being zero as a new filtering size to be applied to the acquired image. It is possible to increase its processing speed, as compared with the former case where the whole window region is used as a filtering size.

By performing the above-mentioned operation, the adaptive filter coefficient production means (step S13) produces a filtering region of an adaptively optimum size by taking into account the characteristic of acquired image data to a certain extent and finishes filter coefficient production processing.

1-6. Description of Filter Processing Step

After the processing of producing an adaptive filter coefficient (step S13 in FIG. 4) is performed, multiplying the respective acquired data of Y, Cb, and Cr by the adaptive filter coefficients produced for each pixel is performed as the operation of filter processing (step S14 in FIG. 4). In this case, the produced filter coefficients are used and the respective data of Y, Cb, and Cr are subjected to, for example, two-dimensional FIR filter processing by using these filter coefficients as linear filter coefficients in a spatial domain.

Further, a computation time can be shortened by adopting a method for performing the filter processing, in which only Y data is multiplied by an adaptive filter coefficient and not performing the filter processing of the Cb data and the Cr data. Furthermore, in order to eliminate an effect produced by aliasing and to increase a processing speed, it is also possible to adopt the processing operation of outputting effective data, which is obtained by removing the edge part of the image corresponding to the filtering size determined by the above-mentioned method from the acquired image, as data after filter processing. In this case, it can be thought to adopt the operation of filling the removed edge part (margin) with gray (gradation level: 128) or black (gradation level: 255) or edge pixel values.

In the above description, it is assumed that the image is corrected by the camera-equipped mobile terminal 1. However, it is also possible to perform the above-mentioned processing by a digital camera and a TV system to which an image (still image and moving image) acquired by a digital camera or a camera-equipped mobile terminal is inputted.

Moreover, an image taken by a digital camera or a camera-equipped mobile terminal may be corrected by an external device such as a computer. In this case, it is also possible to put the contents of image correction processing in FIG. 4 into a program and to input the program to a computer via a network or a recording medium to perform the program on the computer.

1-7. Effect of First Embodiment

As described above, according to the camera-equipped mobile terminal 1 including the image correction device 11 according to the first embodiment, it is possible to eliminate the need for providing a sensor for detecting the physical quantity causing a factor necessary for correcting hand-held camera shake and the like and to perform adaptive correction processing of an image taken with hand-held camera shake by a simple construction and to acquire a good image, in which the effect of hand-held camera shake is reduced.

Further, according to the image correction device 11 according to the first embodiment, it is possible to adopt a method for enabling only a filter coefficient only in region, in which the window region local difference value $D_w(i, j)$ is smaller than the threshold value $D_t$, in the adaptive filter coefficient and the filtering size used when the acquired image is subjected to the filter processing. Therefore, it is possible to execute control not so as to perform image processing as much as possible, in which the blurred image resulting from hand-held camera shake is less apt to be visually recognized because its edge is inherently conspicuous. Further, in addition to this operation, by determining a new filtering region including only effective filter coefficients not being zero, the processing speed can be increased.

Furthermore, when the image correction processing method according to the first embodiment is put into a program that can be read from a recording medium by a PC or can be downloaded and acquired via the Internet or the like, an image taken by a digital camera or a camera-equipped mobile terminal 1 can be corrected by an external device such as a PC.

Second Embodiment

2-1. Construction of Second Embodiment

In the above-mentioned the first embodiment, in the operation of determining a difference value in the image correction method (step S11 in FIG. 4), the method for determining its difference value determination region 32 is constructed so as to set an arbitrary size within the taken image size with a reference point set at the central part of the taken image. However, there are cases where a user takes an image with a subject intentionally arranged near the edge of a screen, depending on an image to be taken. In this case, the user puts the image to be taken into focus not at the central position in the screen but at the edge of the screen in which the subject exists. As to the taken image taken under such situation, in the case of the operation of the first embodiment, because the difference value determination region 32 is found with the reference point at the center of the image, there occurs the situation in which a correct determination of hand-held camera shake cannot not be made. Therefore, the second embodiment is constructed in such a way that a good correction can be made even at the time of taking an image with hand-held camera shake when the user puts an image to be taken into focus at a region other than the central position of the screen (for example, at the edge of the screen).

In General, a case where the image to be taken is put into focus at the edge of the screen is almost a case where the user intentionally arranges a subject at the edge of the screen and takes the image with the subject put into focus by using the function of a camera. Various methods can be thought as the function of a camera to realize this and three methods shown below by <1> to <3> can be thought as typical methods.

<1> Case where Focus Lock Function is Used

In this method, the focus detection sensor region of a camera is only in the center of a screen; and a user puts a subject into focus at the central position of the screen and then locks the focus by some method such as operating a button and takes an image by arranging the subject at an arbitrary position in the screen with the focus held locked.

<2> Case where Multi-Focus Function is Used

In this method, the focus detection sensor region of a camera is not only in the center of a screen, but focus detection sensors are arranged in a plurality of regions; and the user selects the sensor in a region in which the user wants to put an image to be taken into focus from the plurality of sensors or a camera uses an image processing function to automatically select the sensor in a region in which a subject exists, whereby an image is taken in a state where the subject in a region other than the central position of the screen is put into focus.

<3> Case where Image Processing Function is Used

In this method, like a multi-focus function, the area of a taken image is previously divided into sub-areas, and a sub-area in a region in which the user wants to put an image to be taken into focus can be selected or the position of a subject can be automatically detected, whereby a specific sub-area can be selected from the divided sub-areas. In the case of using the image processing function, focus is detected not by using the focus lock function and the sensor in the multi-focus function but by image processing.

As to the above-mentioned three methods, in the second embodiment, when a main body of the device has a function of putting an image to be taken into focus in a region other than the center of the taken image that has been shown in the multi-focus function and the image processing function, a normal correction operation can be performed even to such a blurred image that is put into focus in an area other than the center of the screen of the image by using its focus position region setting information or focus detection region information for a method for determining a difference value determination region 32. Therefore, the second embodiment is different from the first embodiment only in the method for determining a difference value determination region 32 in the difference value determination processing (step S11 in FIG. 4) in the operation of the image correction processing method that has been described in the first embodiment and is shown in FIG. 4.

Figure 11:
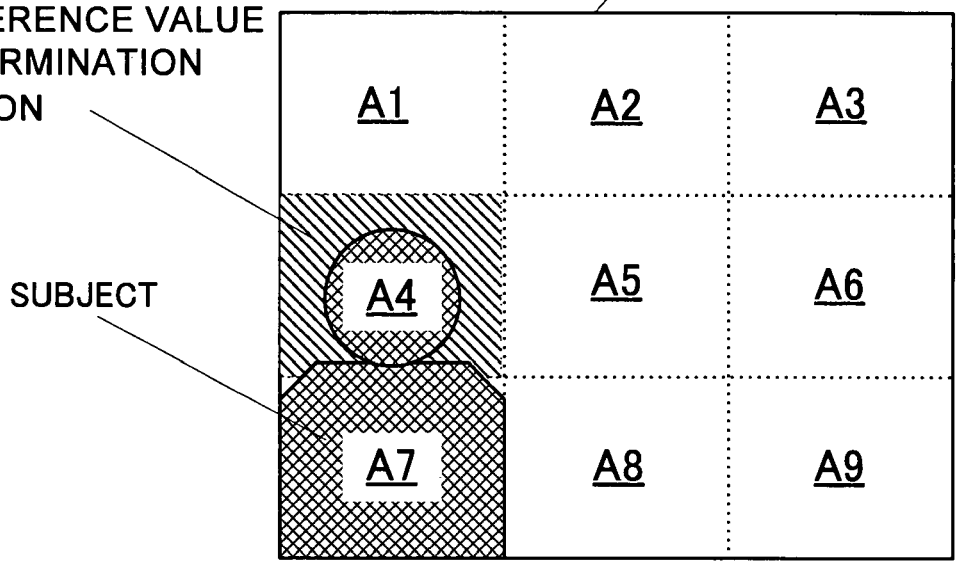
FIG. 11 is a diagram for explaining divided focus areas used in an image correction device according to the second embodiment (that is, device for performing an image correction method according to the second embodiment).

FIG. 11 is a diagram showing a method for determining a difference value determination region 32 of the image correction method according to the second embodiment. In FIG. 11 is shown the region of an image taken by a camera, which has focus area information such that the area of a taken image is divided into nine areas A1 to A9 as the function of the camera. When the user intentionally puts an image to be taken into focus in a specified region A4 shown in FIG. 11 or when the camera automatically recognizes the region A4 in which a subject exists by the image processing function of the camera, the CPU 12 uses its position information for the operation of finding the difference value determination region 32 in the operation of determining a difference value (step S11 in FIG. 4). For example, a method is conceivable in which when a region in which the image to be taken is put into focus is the region A4 in FIG. 11, the region A4 or its peripheral region including the region A4 is used as the difference value determination region 32. The number of sub-areas into which the area of a taken image is divided in the above-mentioned operation may be an arbitrary number and may be a number other than nine shown in FIG. 11. Moreover, when processing using the above-mentioned correction method is performed not by an image correction device but is described in a program and is performed by a PC or the like other than the image correction device, it is also possible that the PC or the like reads the focus area information added to Exif (Exchangeable Image Format) information and the like of the acquired image data and operates so as to determine the difference value determination region 32 from the information.

2-2. Effect of Second Embodiment

By using the above-mentioned operation for the method for determining a difference value determination region 32 in the difference value determination processing (step S11 in FIG. 4), it is possible to determine the appropriate difference value of the acquired image even for such a blurred image that is put into focus in a region other than the center of the screen. Therefore, an excellent image correction effect can be obtained.

What is claimed is:

1. An image correction device for correcting image degradation resulting from camera shake comprising:
a difference value determination device which computes window region local difference values for a plurality of neighboring pixels, each of the window region local difference values being a difference value between image data of a notice pixel in a difference value determination region formed of a whole or a part of a screen area of an input image and image data of a neighboring pixel in a window region set around the notice pixel, and determines a maximum local difference value which is a maximum value of the window region local difference values in each window region;

an input image evaluation device which determines a threshold value reflecting a characteristic of the input image in accordance with the maximum local difference value;

a filter coefficient production device which produces adaptive filter coefficients for respective pixels of the input image by using the threshold value, the adaptive filter coefficients having an effect of high-pass filtering on the image; and a filter processing device which performs filter processing of the input image by using the adaptive filter coefficients.

2. The image correction device according to claim 1, wherein the window region is a rectangular region which extends in a horizontal direction of the screen area from the notice pixel and extends in an upper vertical direction or in a lower vertical direction of the screen area.

3. The image correction device according to claim 1, wherein the threshold value is a value obtained by multiplying the maximum local difference value by a constant value ranging from zero to one.

4. The image correction device according to claim 1, wherein the producing of the adaptive filter coefficients by the filter coefficient production device includes:
processing of computing the adaptive filter coefficients for pixels whose window region local difference values are smaller than the threshold value; and
processing of bringing the adaptive filter coefficient for pixels whose window region local difference values are not smaller than the threshold value into zero.

5. The image correction device according to claim 4, wherein an effective filter region in which filter processing is performed by the filter processing device is determined on the basis of a region in which the adaptive filter coefficient is not zero.

6. The image correction device according to claim 1, wherein the filter processing by the filter processing device includes processing of multiplying image data of each pixel of the input image by an adaptive filter coefficient of a corresponding pixel.

7. The image correction device according to claim 1, wherein the difference value determination device determines the difference value determination region on the basis of focus position information specifying a part of the screen area of the input image as a focus position.

8. An image correction method for correcting image degradation resulting from camera shake comprising the steps of:
computing window region local difference values for a plurality of neighboring pixels, each of the window region local difference values being a difference value between image data of a notice pixel in a difference value determination region formed of a whole or a part of a screen area of an input image and image data of a neighboring pixel in a window region set around the notice pixel, thereby determining a maximum local difference value which is a maximum value of the window region local difference values in each window region;

determining a threshold value reflecting a characteristic of the input image on the basis of the maximum local difference value;

producing adaptive filter coefficients for respective pixels of the input image by using the threshold value, the adaptive filter coefficients having an effect of high-pass filtering on the image; and performing filter processing of the input image by using the adaptive filter coefficients.

9. The image correction method according to claim 8, wherein the window region is a rectangular region which extends in a horizontal direction of the screen area from the notice pixel and extends in an upper vertical direction or in a lower vertical direction of the screen area.

10. The image correction method according to claim 8, wherein the threshold value is a value obtained by multiplying the maximum local difference value by a constant value ranging from zero to one.

11. The image correction method according to claim 8, wherein the step of producing the adaptive filter coefficient includes:

processing of computing the adaptive filter coefficients for pixels whose window region local difference values are smaller than the threshold value; and processing of bringing the adaptive filter coefficient for pixels whose window region local difference values are not smaller than the threshold value into zero.

12. The image correction method according to claim 11, wherein an effective filter region in which filter processing is performed is determined on the basis of a region in which the adaptive filter coefficient is not zero.

13. The image correction method according to claim 8, wherein the filter processing includes processing of multiplying image data of each pixel of the input image by an adaptive filter coefficient of a corresponding pixel.

14. The image correction method according to claim 8, wherein the difference value determination region is determined on the basis of focus position information specifying a part of the screen area of the input image as a focus position.

* * * * *